United States Patent [19]

Suzuki et al.

[11] Patent Number: 4,829,323

[45] Date of Patent: May 9, 1989

[54] COLOR IMAGE RECORDING APPARATUS

[75] Inventors: Akio Suzuki, Tokyo; Masaharu Ohkubo; Yoshihiro Takada, both of Yokohama, all of Japan

[73] Assignee: Canon Kabushiki Kaisha, Tokyo, Japan

[21] Appl. No.: 87,918

[22] Filed: Aug. 21, 1987

[30] Foreign Application Priority Data

Aug. 25, 1986 [JP] Japan ................................ 61-197206

[51] Int. Cl.[4] ................................ G01D 15/16

[52] U.S. Cl. ................................ 346/140 R; 358/80

[58] Field of Search .................... 346/140; 358/75, 78, 358/80

[56] References Cited

U.S. PATENT DOCUMENTS

| | | | |
|---|---|---|---|
| 4,250,512 | 2/1981 | Kattner et al. | 346/140 R |
| 4,275,402 | 6/1981 | Kern | 346/140 |
| 4,352,114 | 9/1982 | Kyogoku et al. | 346/140 R |
| 4,376,945 | 3/1983 | Hara et al. | 346/140 R |
| 4,544,931 | 10/1985 | Watanabe et al. | 346/140 R |
| 4,631,578 | 12/1986 | Sasaki | 358/80 |
| 4,672,432 | 6/1987 | Sakurada | 358/75 |
| 4,719,472 | 1/1988 | Arakawa | 346/140 R |

FOREIGN PATENT DOCUMENTS

| | | |
|---|---|---|
| 57-13855 | 1/1982 | Japan . |
| 57-13856 | 1/1982 | Japan . |
| 57-13857 | 1/1982 | Japan . |
| 57-13445 | 1/1982 | Japan . |

*Primary Examiner*—Joseph W. Hartary
*Attorney, Agent, or Firm*—Fitzpatrick, Cella, Harper & Scinto

[57] ABSTRACT

A color image recording apparatus to record a color image by printing coloring agents of different colors comprises: recording heads such as ink jet heads to record coloring agents such as inks of different colors; temperature sensors, provided for the recording heads, for detecting temperatures of the heads; a color correction circuit to perform the color correction of an input color image signal; a drive circuit to drive the heads in response to correction outputs of the color correcting circuit; and a change control circuit to change correction characteristics of the color correcting circuit on the basis of detection outputs of the temperature sensors. The color processes are changed in accordance with a change in temperature of each head. With this apparatus, even if the temperatures of the respective color heads differ, stable color reproducibility can be maintained.

22 Claims, 5 Drawing Sheets

COLOR IMAGE RECORDING APPARATUS

BACKGROUND OF THE INVENTION

1. Field of the Invention

The present invention relates to an image recording apparatus and, more particularly, to an image recording apparatus for forming a color image by printing coloring agents of a plurality of colors.

2. Related Background Art

Hitherto, an ink jet recording apparatus to form an image by spouting ink from nozzles each having a small diameter has been well known. The ink jet recording apparatus is widely used as a color image recording apparatus since a color image can be easily obtained by overlapping printing inks of a plurality of colors.

FIG. 4 shows a scanning method of ink jet heads in the case of obtaining a color image by overlapping the inks of three colors of yellow, magenta, and cyan.

In the diagram, multi-nozzle heads lA, lB, and 1C are arranged at a distance d from each other and are scanned on a recording sheet 3 at a velocity v in the direction of an arrow 4 while spouting ink from orifices 2. The head lA is used for the yellow ink. The head lB is used for the magenta ink. The head 1C is used for the cyan ink. These inks are printed on the recording sheet 3 in accordance with the order of yellow, magenta, and cyan.

FIG. 5 is a block diagram for image signal processes of such an ink jet recording apparatus.

Input signals 5*a* to 5*c* indicative of image densities of three colors of yellow, magenta, and cyan are supplied to a color process unit 6 and are subjected to color processes such as a masking process and the like. Thereafter, the color processed signals are input to a gradation correction unit 7 and are Y-corrected. After completion of the correction, the yellow signal among the three color signals is directly sent to a recording head 9A. However, the magenta and cyan signals are first stored into buffers 8A and 8B and thereafter, they are delayed by the time corresponding to a distance d in the scanning direction of the recording heads. Namely, the magenta signal is delayed by the time of d/v and the cyan signal is delayed by the time of 2d/v. The delayed magenta and cyan signals are sent to heads 9B and 9C.

Thus, the inks of the respective colors of yellow, magenta, and cyan are printed at the same position on the recording sheet 3 and a color image is reproduced.

In such an ink jet recording apparatus, when the heads are driven, beat is generated therefrom and, by continuing the printing operation, the temperatures of the heads increase. In general, although the viscosity of ink decreases with an increase in temperature, the emission amount of ink from the head increases with a decrease in viscosity.

On the other hand, a stained amount of ink in the recording sheet also increases as the viscosity of ink is low. Therefore, the dot area on the recording sheet is enlarged by the temperature increase of the head and the image density raises.

FIG. 6 is a diagram for explaining such a situation and shows that the $\gamma$ characteristic changes by a change in temperature of the head.

In this manner, the image density and $\gamma$ characteristic change by an increase in temperature of the head. On the other hand, as shown in FIG. 4 in an apparatus such that a color image is formed by spouting ink of different colors from a plurality of heads, an increase ratio of the temperature of each head is not uniform. There is a difference of the increase in temperature of each head in dependence on original documents. For example, in the case of an image having a blue sky as a background image, the temperature of the cyan head particularly increases. In the case of an image having an evening sun as a background image, the increase in temperature of the cyan head will be minimal. In such a case, there occurs a difference of the $\gamma$ characteristic of each color, so that the color balances before and after the temperature increases are different and there is a drawback such that the color reproduction cannot be stably performed.

Particularly, in an apparatus such that the ink is heated by a heater and is emitted by the thermal energy, the foregoing inconvenience is remarkable.

To solve the foregoing drawbacks, the same applicant as the present patent application has proposed techniques such that amplification factors and the like of input color signals are variably controlled by detecting an ambient temperature and humidity in Japanese Unexamined Patent Publication (Kokai) Nos. 13855/1982, 13856/1982, 13857/1982, and 13445/1982. However, in these techniques, since the temperature of the head itself is not detected, it is difficult to accurately control a color image.

SUMMARY OF THE INVENTION

It is an object of the present invention to provide a color image recording apparatus which can eliminate the foregoing drawbacks in the conventional apparatuses and can always obtain a stable image even if there is a difference of the temperature of the head for each color.

An image recording apparatus of the invention is characterized by having temperature detecting means for detecting a temperature of the print head and means for changing the color process in accordance with the result of the detection of the temperature detecting means.

According, to the present invention, by detecting a temperature of the print head and by changing the color process in accordance with the result of the detection, stable color reproducibility can be maintained even if the temperature of head of each color becomes diffrent.

The above and other objects and features of the present invention will become apparent from the following detailed description and the appended claims with reference to the accompanying drawings.

DETAILED DESCRIPTION OF A PREFERRED EMBODIMENT

The present invention will be described hereinbelow with respect to an embodiment with reference to the drawings.

Figure 1:
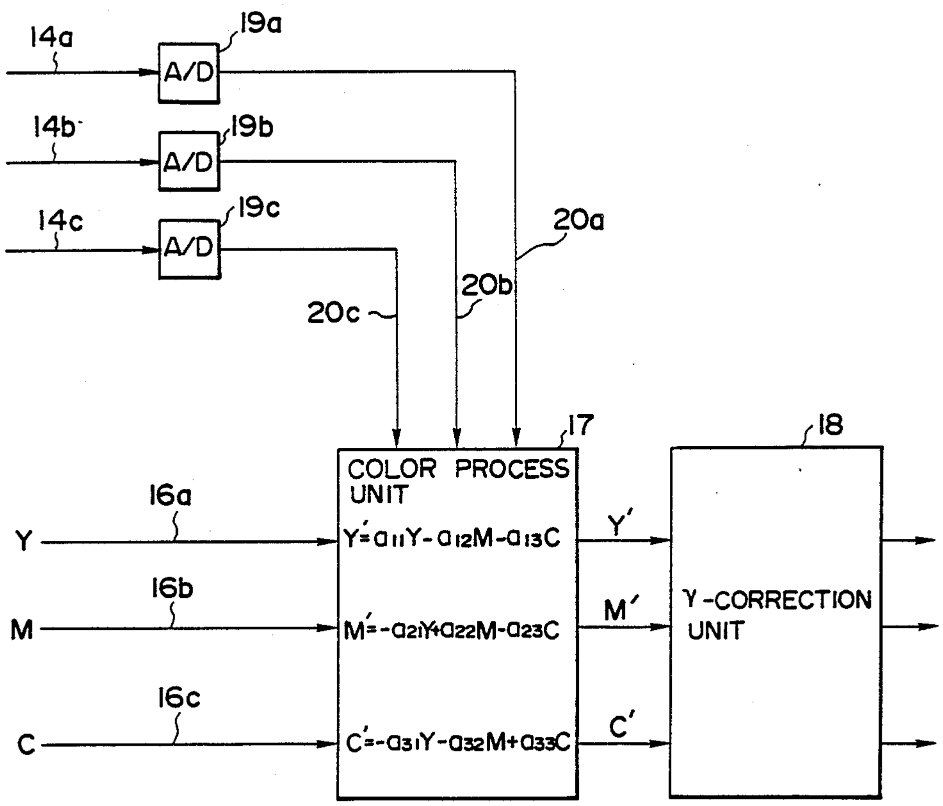
FIG. 1 is a block diagram of an embodiment of an image in the present invention.
Figure 2:
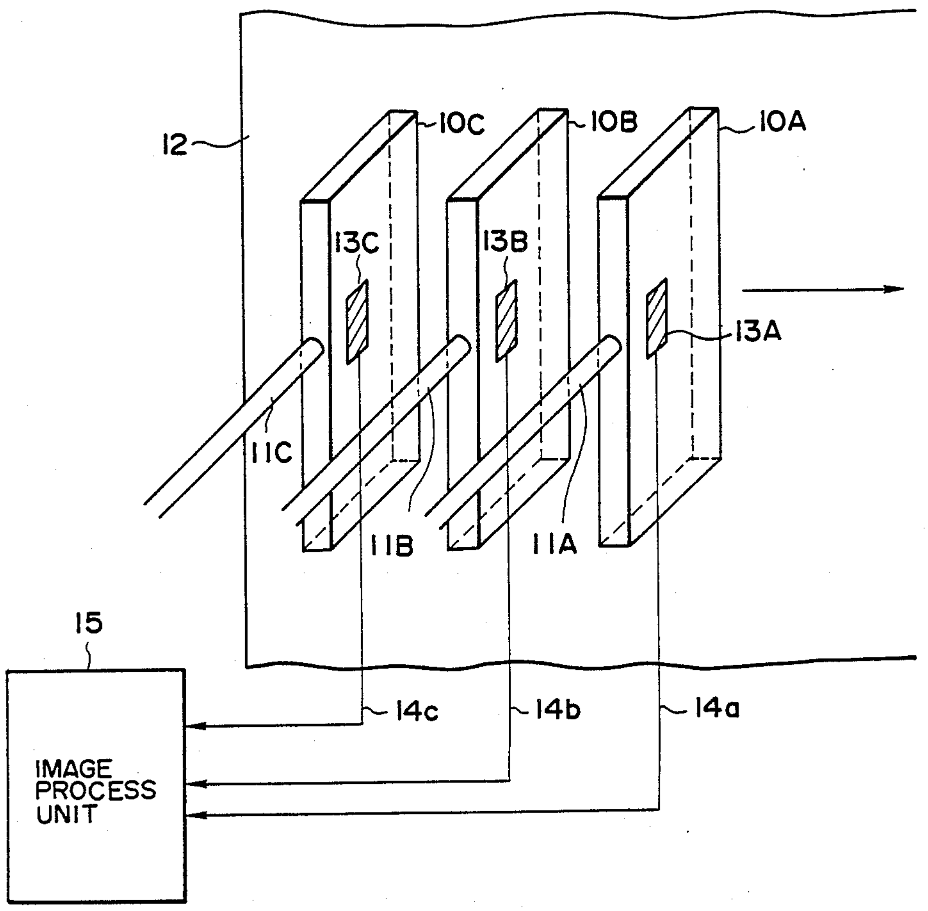
FIG. 2 is a schematic diagram of the portions near heads in the embodiment of the invention.

FIG. 1 is a block diagram of an image process unit in an embodiment of an image recording apparatus of the invention. FIG. 2 shows a schematic diagram of an embodiment of the invention.

In FIG. 2, inks are supplied from ink supply tubes 11A, 11B, and 11C to a head 10A for yellow, a head 10B for magenta, and a head 10C for cyan, respectively. These heads are scanned in the direction of an arrow and print the respective color inks onto a recording sheet 12, thereby forming a color image. Temperature sensors 13A, 13B, and 13C such as, e.g., thermistors or the like are attached to the heads 10A, 10B, and 10C, respectively. Temperature signals 14A to 14C of the heads are input to an image process unit 15. As the heads, ink jet head of the type such that babbles are formed by the heat generated from thermal heads and ink dots are emitted as disclosed in, e.g., U.S. Pat. No. 4,296,421 are used. Further, ink jet heads using the electrical-mechanical conversion as disclosed in U.S. Pat. No. 3,683,212 may be also used.

FIG. 1 is a block diagram of the image process unit of the embodiment.

Signals **16*a* (Y), 16*b* (M), and 16*c* (C) of respective colors of yellow, magenta, and cyan which were input from a reading unit or image data storage unit (not shown) are supplied to a color process unit 17** and are subjected to color processes such as masking process and the like. For the input signals Y, M, and C, the following masking processes are performed.

$$Y' = a_{11}Y - a_{12}M - a_{13}C \quad (1)$$

$$M' = -a_{21}Y + a_{22}M - a_{23}C \quad (2)$$

$$C' = -a_{31}Y - a_{32}M + a_{33}C \quad (3)$$

In this manner, the color correction is performed. The signals which were color corrected by the masking are then input to a γ-correction unit 18 and the gradations are corrected. Thereafter, the gradation corrected signals are sent to heads (not shown) and inks are printed, so that a color image is formed.

On the other hand, the temperature signals **14*a*, 14*b*, and 14*c* of the respective heads are converted into the digital signals by A/D converters 19*a* to 19*c* and thereafter, they are input as coefficient selection signals 20*a* to 20*c* to the color process unit 17**.

The color process unit 17 switches the coefficients in the foregoing masking equations (1) to (3) in response to the coefficient selection signals.

Figure 3:
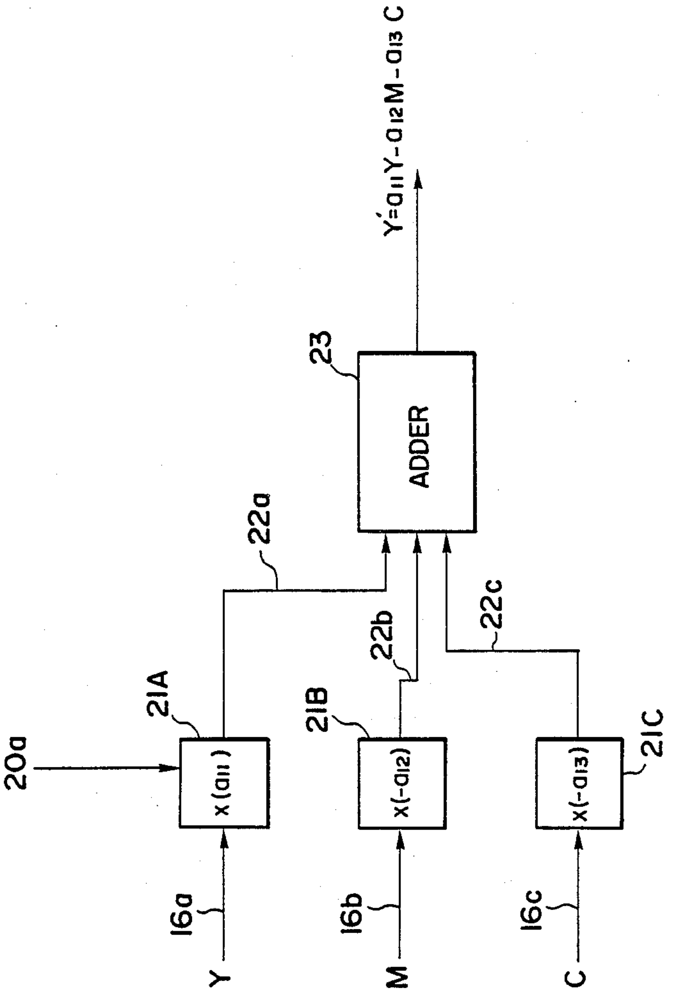
FIG. 3 is a block diagram of a masking operating circuit in the embodiment of the invention.
Figure 4:
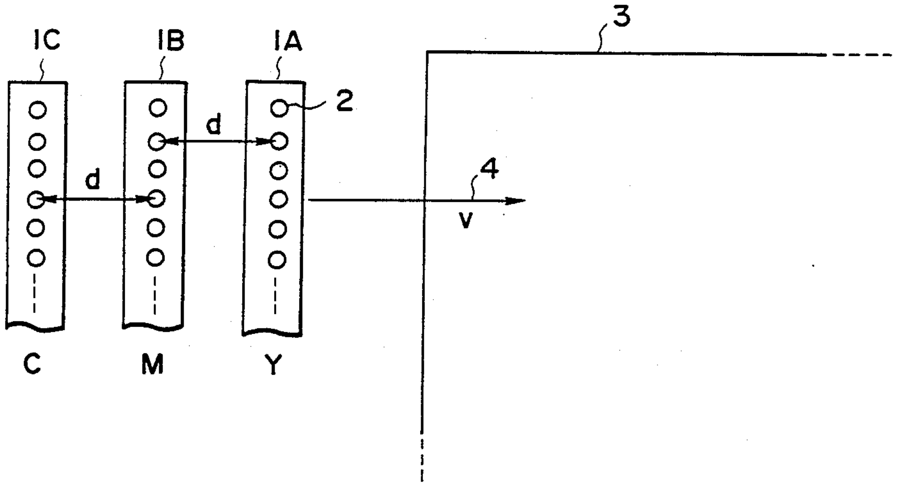
FIG. 4 is a schematic diagram showing an arrangement and a scanning method of the heads of a color ink jet apparatus.
Figure 5:
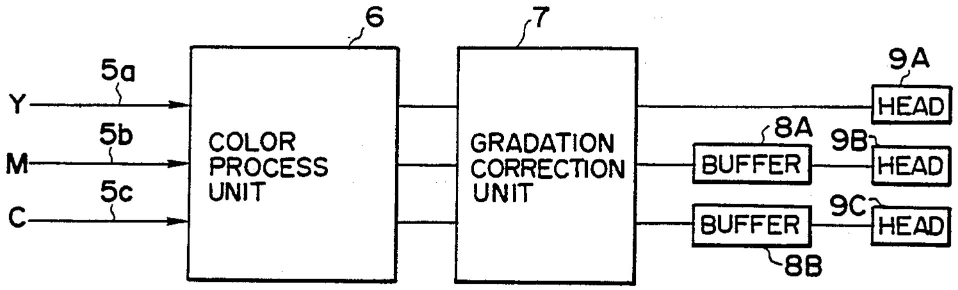
FIG. 5 is an image process block diagram of a conventional apparatus.
Figure 6:
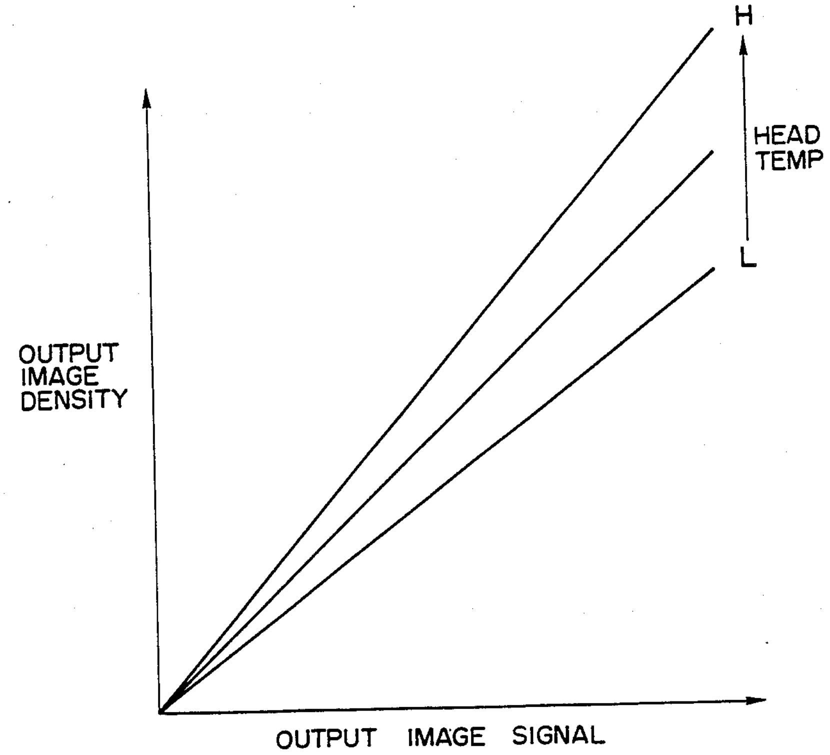
FIG. 6 is a $\gamma$ diagram when a temperature of head is changed.

FIG. 3 is a block diagram of a masking process operating circuit in the embodiment.

Digital signals **16*a* to 16*c* of three colors are respectively input to coefficient ROMs 21A, 21B, and 21C and are multiplied with coefficients $a_{11}$, $-a_{12}$, and $-a_{13}$ and the resultant signals 22*a* to 22*c* are output. The coefficient ROMs 21A to 21C use the input signals as the address data. The values which are derived by multiplying the coefficients to the addresses are stored in these ROMs. Thus, the signals which are obtained by multiplying the coefficients to the inputs are output. Among the three coefficient ROMs, a plurality of kinds of coefficients are prepared in the ROM 21A and can be switched by the selection signal from the outside. The temperature signal of the head for yellow is A/D converted to obtain the signal 20*a*. The signal 20*a*** is input as the selection signal. In response to this signal, the coefficient $a_{11}$ is switched.

The signals **22*a* to 22*c* are added by an adder 23**. In this manner, the arithmetic operation of the equation (1) is finished.

The arithmetic operations are also performed with respect to the equations (2) and (3) in a manner similar to the above. The coefficient $a_{22}$ in the equation (2) is switched in response to the temperature signal of the head for magenta. The coefficient $a_{33}$ in the equation (3) is also switched in response to the temperature signal of the head for cyan.

The value of each coefficient to be switched is set so as to become small with an increase in temperature of the head.

For example, in particular, when the temperature of the head for cyan suddenly increases, in the conventional apparatus, the hue of image is shifted so as to emphasize cyan. However, according to the invention, the value of the coefficient $a_{33}$ in the equation (3) decreases with an increase in temperature of the head for cyan and the print signal of cyan is reduced, so that the image of the stable hue is derived.

In the foregoing embodiment, the coefficient to be switched in accordance with the temperature of the head has been set into all in the equation (1), $a_{22}$ in the equation (2), or $a_{33}$ in the equation (3). However, in place of reducing the value of $a_{11}$, the other coefficients may be also switched by, for example, increasing the values of $a_{12}$ and $a_{13}$ or the like. On the other hand, all of the coefficients may be also switched.

The case of the linear masking has been described as an example of the processes to be executed in the color process unit. However, other color processes such as nonlinear masking and the like are also incorporated in the scope of the invention if these processes are such that the coefficients are switched so as to eliminate the influence by the increase in temperature in accordance with the temperature of head.

On the other hand, in the foregoing embodiment, an explanation has been made with respect to the case where the undercolor is not eliminated but a color image is recorded by only three colors of yellow, magenta, and cyan. However, the invention can be also similarly embodied with respect to the case where the undercolor is eliminated and a color image is recorded by four colors including black. In this case, the following arithmetic operations are performed for the input three-color signals.

$$Y'' = Y - a_1' \times \min(Y.M.C) \quad (4)$$

$$M'' = M - a_2' \times \min(Y.M.C) \quad (5)$$

$$C'' = C - a_3' \times \min(Y.M.C) \quad (6)$$

Further, the following arithmetic operation is performed for the black signal.

$$BK = a_4' x \min(Y.M.C) \quad (7)$$

It is sufficient to switch the value of $a_4'$ in accordance with the temperature of head for black. In this case, on the other hand, the coefficients $a_1'$ to $a_3'$ in the equations (4) to (6) may be also switched in place of switching the masking coefficients in accordance with the temperatures of heads for yellow, magenta, and cyan.

In the embodiment, the temperatures of all heads have been detected. However, the temperatures may not be detected for an image such that a change in hue of the image is inconspicuous even when the $\gamma$ characteristic changes because of a change in temperature such as in the case of yellow.

In brief, it is sufficient to use a constitution such that the temperatures of a plurality of heads are detected and the color processes are switched in accordance with the result of the detection.

On the other hand, although the coefficients of the color processes have been switched in the foregoing embodiment, the color processing tables may be also selectively switched.

Although the embodiment using an ink jet recording head has been described above, the invention can be also applied to all printers such as thermal printer, thermal copy transfer type printer, and the like in which an amount or viscosity of coloring agent varies in dependence on the temperature.

As described above, in an image recording apparatus for forming a color image by emitting coloring agents of different colors from a plurality of print heads, the temperatures of print heads are detected and the color processes are changed in accordance with the result of the detection, so that the stable color reproducibility can be always held even if the temperatures of the respective color heads differ.

We claim:

1. A color image recording apparatus comprising:

a plurality of recording heads for recording coloring agents of different colors;

temperature detecting means, provided for said plurality of recording heads, for detecting temperatures of each of said recording heads;

color correcting means for performing color correction of input color image signals;

drive means for driving said recording heads in response to correction outputs of said color correcting means; and variable control means for changing correction characteristics of said color correcting means in accordance with detection outputs of said temperature detecting means.

2. A color image recording apparatus according to claim 1, wherein said correcting means has a color correction masking circuit and said variable control means changes correction characteristics of said masking circuit.

3. A color image recording apparatus according to claim 1, wherein said correcting means has an undercolor eliminating circuit and said variable control means changes characteristics of said undercolor eliminating circuit.

4. A color image recording apparatus according to claim 1, wherein ink jet recording heads are used as said recording heads.

5. A color image recording apparatus according to claim 4, wherein said ink jet recording head emits an ink droplet by use of an exothermic device.

6. A color image recording apparatus comprising:

a plurality of ink jet recording heads to record coloring agents of different colors;

a plurality of temperature detecting sensors, provided for at least two of said plurality of ink jet recording heads, for detecting temperatures of said ink jet recording heads;

input means for inputting a color image signal;

drive means for driving said ink jet recording heads independently in response to a plurality of drive signals according to said input color image signal; and control means for correcting said drive signals independently in accordance with outputs of said plurality of temperature detecting sensors.

7. A color image recording apparatus according to claim 6, further having color correcting means for color correcting said input color image signal, and wherein said control means changes correction characteristics of said color correcting means.

8. A color image recording apparatus according to claim 7, wherein said correcting means has a color correction masking circuit and said control means changes correction characteristics of said masking circuit.

9. A color image recording apparatus according to claim 7, wherein said correcting means has an undercolor eliminating circuit and said variable control means changes characteristics of said undercolor eliminating circuit.

10. A color image recording apparatus according to claim 6, wherein said ink jet recording head emits an ink droplet by use of an exothermic device.

11. A recording apparatus comprising:

a plurality of ink jet recording units;

a plurality of temperature detecting sensors provided for said plurality of ink jet recording units, for detecting temperatures of said ink jet recording units;

drive signal generating means for generating, in response to an input image signal, a plurality of drive signals to drive said plurality of ink jet recording units; and correcting means for independently correcting each of said plurality of drive signals, in accordance with outputs from said plurality of temperature detecting sensors.

12. A recording apparatus according to claim 11, wherein said input image signal includes a color image signal.

13. A recording apparatus according to claim 11, wherein said correcting means comprises a masking circuit for color correction and independently corrects each of said drive signals according to the output from said temperature detecting sensor.

14. A recording apparatus according to claim 11, wherein said correcting means comprises an under color removal circuit and independently controls each of said drive signals according to the output from said temperature detecting sensor.

15. A recording apparatus according to claim 11, wherein said ink jet recording unit emits an ink droplet by use of an exothermic device.

16. A recording apparatus according to claim 12, wherein said plurality of ink jet recording units include four units respectively provided for yellow, magenta, cyan and black.

17. A recording apparatus according to claim 11, wherein each of said plurality of ink jet recording units includes a multi-nozzle head.

18. A recording apparatus comprising:

a plurality of ink jet recording units, the number of said ink jet recording units corresponding to the number of kinds of record coloring agents;

a plurality of temperature detecting sensors provided for said plurality of ink jet recording units, for detecting temperatures of said ink jet recording units;

drive signal generating means for generating, in response to an input image signal, a plurality of drive signals to drive said plurality of ink jet recording units, said plurality of drive signals corresponding to said record coloring agents; and correcting means for independently correcting each of said plurality of drive signals, in accordance with outputs from said plurality of temperature detecting sensors.

19. A recording apparatus according to claim 18, wherein said correcting means comprises a masking circuit for color correction and independently corrects each of said drive signals according to the output from said temperature detecting sensor.

20. A recording apparatus according to claim 18, wherein said correcting means comprises an under color removal circuit and independently controls each of said drive signals according to the output from said temperature detecting sensor.

21. A recording apparatus according to claim 18, wherein said plurality of ink jet recording units include four units respectively provided for yellow, magenta, cyan and black.

22. A recording apparatus according to claim 18, wherein each of said plurality of ink jet recording units includes a multi-nozzle head.

* * * * *